US009527426B2

(12) United States Patent
Lavmand

(10) Patent No.: US 9,527,426 B2
(45) Date of Patent: Dec. 27, 2016

(54) ATTACHMENT STRUCTURE FOR SUPPORTING AND RELEASABLY ATTACHING A CONTAINER, A CORRESPONDING SUPPORT STRUCTURE, A TRANSPORT VEHICLE AND A CONTAINER

(71) Applicant: Clean City Cargo Concept ApS, Ringsted (DK)

(72) Inventor: Per Lavmand, Espergærde (DK)

(73) Assignee: Clean City Cargo Concept APS, Ringsted (DK)

( * ) Notice: Subject to any disclaimer, the term of this patent is extended or adjusted under 35 U.S.C. 154(b) by 0 days.

(21) Appl. No.: 14/528,092

(22) Filed: Oct. 30, 2014

(65) Prior Publication Data

US 2015/0125232 A1 May 7, 2015

(30) Foreign Application Priority Data

Nov. 1, 2013 (DK) .................................. 201300623

(51) Int. Cl.

*B60P 7/08* (2006.01)
*B60P 7/13* (2006.01)
*B60P 3/42* (2006.01)
*B60P 1/64* (2006.01)

(52) U.S. Cl.

CPC .. *B60P 7/13* (2013.01); *B60P 3/42* (2013.01); *B60P 1/6481* (2013.01)

(58) Field of Classification Search

CPC ................ B60P 7/13; B60P 3/42; B60P 1/648
USPC ..... 410/77, 80, 81, 90, 91, 71, 76; 414/498; 280/DIG. 8
See application file for complete search history.

(56) References Cited

U.S. PATENT DOCUMENTS 3,259,400 A 7/1966 Tantlinger
5,562,374 A * 10/1996 Plamper .......................... 410/77
5,829,946 A * 11/1998 McNeilus et al. .............. 410/80

FOREIGN PATENT DOCUMENTS

EP 2143588 1/2010

OTHER PUBLICATIONS

European Search Report dated Aug. 24, 2016 from European Application No. 14190711.3.

* cited by examiner

*Primary Examiner* — Stephen Gordon
(74) *Attorney, Agent, or Firm* — K. David Crockett, Esq.; Niky Economy Syrengelas, Esq.; Crockett & Crockett, PC

(57) ABSTRACT

An attachment structure (2) for supporting and releasably attaching a container (1), cargo bed or the like to a transport vehicle (25, 32) and a mating support structure (31) configured to be provided on the transport vehicle (25, 32), the attachment structure being provided with releasable locking mechanisms (12) configured to provide a releasable locking of the attachment structure (2) to the support structure (31). The invention facilitates easy and flexible distribution of goods by way of environmental friendly vehicles for instance within the inner region of a city.

20 Claims, 17 Drawing Sheets

1
2
3
4
5
5
5
5
6
7
7
8
9

10
7
48
47
48
47
47
47
10
11
11
8
7
2
6

10
$w_a$
13
12
7
13
8

31
12
14
13'
10

27
29
29
30
28
33

7
35
27
28
13
2
36
34
28
30
7
35
31

31
2
13
$w_S$
$w_B$ 31
2
13

32
35

ATTACHMENT STRUCTURE FOR SUPPORTING AND RELEASABLY ATTACHING A CONTAINER, A CORRESPONDING SUPPORT STRUCTURE, A TRANSPORT VEHICLE AND A CONTAINER

This application claims priority to Danish Patent Application PA 2013 00623 filed Nov. 1, 2013, the contents of which are fully incorporated herein by reference.

FIELD OF THE INVENTIONS

The inventions described below relate to the field of containers and similar means for accommodating goods to be transported and more specifically to means for releasable attachment of such containers to a transport means, such as trucks, lorries, trailers or railway wagons. The use of such containers and transport means for distributing goods in an environmentally friendly manner, for instance within a city.

BACKGROUND OF THE INVENTIONS

The field of cargo transport faces a number of challenges. In known and existing goods distribution transfer systems the goods are collected in the country and outside of the country and transported over individual routes. All transport has to go through the outer zones of the city. This results in a great deal of traffic with conventional combustion engine driven or vehicles in the peripheral zone of the city leading to dense-traffic situations, high emission levels and noise levels. Traditionally, delivery of goods in the inner zone of a city takes place with large or small distribution vehicles of any kind, which vehicles may not be particularly friendly to the environment.

U.S. Pat. No. 3,363,803 describes an attachment structure for supporting and releasably attaching a container, cargo bed or the like to a transport vehicle. The attachment structure has two parallel spaced elongated attachment members. The elongated attachment members have a downwardly facing support surface for abutting an upwardly directed support surface of a support structure on the transport vehicle. The elongated attachment members are provided with a laterally facing guide and engagement surface.

It would hence be desirable to provide transportation means that are friendly to the environment and which can take care of transport of goods for instance in the inner regions of a city.

SUMMARY OF THE INVENTIONS

On this background, it is an object of the systems and methods described below to provide transport vehicles and transport means that allow environmentally friendly transport of goods primarily—although not necessarily—within the inner regions of cities. This object can be achieved by the provision of containers or swap boxes that are provided with means for easy and effective loading and unloading on/from transport vehicles. To this effect, the containers/swap boxes of the present invention are provided with means for releasable attachment to mating means provided on a transport vehicle, preferably a vehicle of a kind that is particularly friendly to the environment. Such vehicles could for instance be battery-powered distribution vehicles. The advantages of such vehicles are low emission, low noise level, and good battery longevity for short distance distribution.

It is noted that although the specific term “container” is used throughout this specification, sometimes together with the alternative term “swap box”, a “container” should be interpreted broadly to comprise any means that can accommodate goods to be transported and/or stored. Thus, for instance, an upwardly open box of wood or any other material will also fall within the scope of the term “container” as used in this specification.

A further advantage of small vehicles is that they are more maneuverable in the city, and are better for traffic safety.

According to an embodiment, vehicles that are categorized as environmentally friendly are either electric battery powered or powered by an environmental friendly combustion engine or powered by a combination of an electric battery and an environmental friendly combustion engine.

The objects are solved by the provision of containers or similar means that are provided with an attachment structure that is either a separate structure that can be attached to the bottom surface of the container or which is formed as an integral part of the container. The attachment structure is designed such that it can be releasably attached and secured to a corresponding support structure that is either a separate structure or an integral structure on a transport vehicle, such as a truck, lorry, trailer or railway wagon.

Preferably, the support structure is a separate structure that is designed such that it can be attached to any suitable vehicle despite differences in the construction/chassis frame of the vehicle.

Preferably, the support structure is provided with quick lock mechanisms that allow quick and easy locking of the attachment structure to the support structure, and thereby the container to the transport vehicle, upon which the support structure is provided. Such quick lock mechanisms allow for securing and releasing without the use of tools.

According to a first aspect there is provided an attachment structure for supporting and releasably attaching a container, cargo bed or the like to a transport vehicle, where the container or cargo bed has a length and a width, and where the attachment structure comprises two parallel spaced elongated attachment/support members that extend along at least most of the length of the container or cargo bed, where the elongated attachment members comprises a downwardly facing support surface for abutting an upwardly directed support surface of a support structure on the transport vehicle, where the elongated attachment members are provided with a laterally facing guide and engagement surface, that is provided with recesses or apertures for entering in a locking engagement with a lock mechanism associated with the transport vehicle.

According to a second aspect there is provided a container comprising an attachment structure as described above.

According to an implementation of the second aspect, the attachment structure is a separate entity as described above, but it can alternatively be formed as an integral part of the container.

According to a third aspect there is provided a support structure for supporting and securing a container, cargo bed or the like to a transport means, such as a vehicle or railway wagon, where the support structure comprises a plurality of transverse support members for supporting an attachment structure according to the invention as described above and a plurality of locking members provided on respective locking mechanisms for releasable locking of the attachment structure to the support structure.

According to a fourth aspect, there is provided transport means, such as a truck, lorry, trailer, train wagon etc. for transporting containers, where the transport means is provided with a support structure as described above. This support structure can either be formed as a separate entity that can be mounted on a transport means on demand or be formed as an integral part of a transport means.

According to a fifth aspect, there is provided an assembly of an attachment structure according and a support structure, where the attachment structure is provided with means that are adapted to enter into a locking and releasable engagement with mating means provided on the support structure.

According to a sixth aspect, use of containers and transport vehicles are provided for environmentally friendly transport and distribution of goods for instance in central parts of a city. The flexible and versatile containers provided with an attachment structure according to the invention together with transport vehicles provided with support structures according to the invention makes it easy to re-load goods from larger and less environmental friendly vehicles unto transport vehicles/containers according to the invention and distribute the good for instance within a central part of a city, where transport using larger and less environmental friendly vehicles would be problematic.

Although in the following detailed description of the invention the example embodiments show application of the principles of the invention specifically on road vehicles, such as trucks, lorries or trailers, it is understood that other transportation means, such as trains, could also be used, and that the application of such means would also fall within the scope of the present invention.

Further objects, features, advantages and properties of the platform system according to the disclosure will become apparent from the detailed description.

BRIEF DESCRIPTION OF THE DRAWINGS

In the following detailed portion of the description, the invention will be explained in more detail with reference to the exemplary embodiments shown in the drawings, in which.

DETAILED DESCRIPTION OF THE INVENTIONS

In the following a detailed description example embodiments of attachment structures, containers, support structures and transport vehicles according to the invention are given, but it is understood that these embodiments only constitute non-limiting examples of how the present invention can be implemented in practice. Also, a practical example of using these various means fro environmental friendly transport of goods is given.

Figure 1:
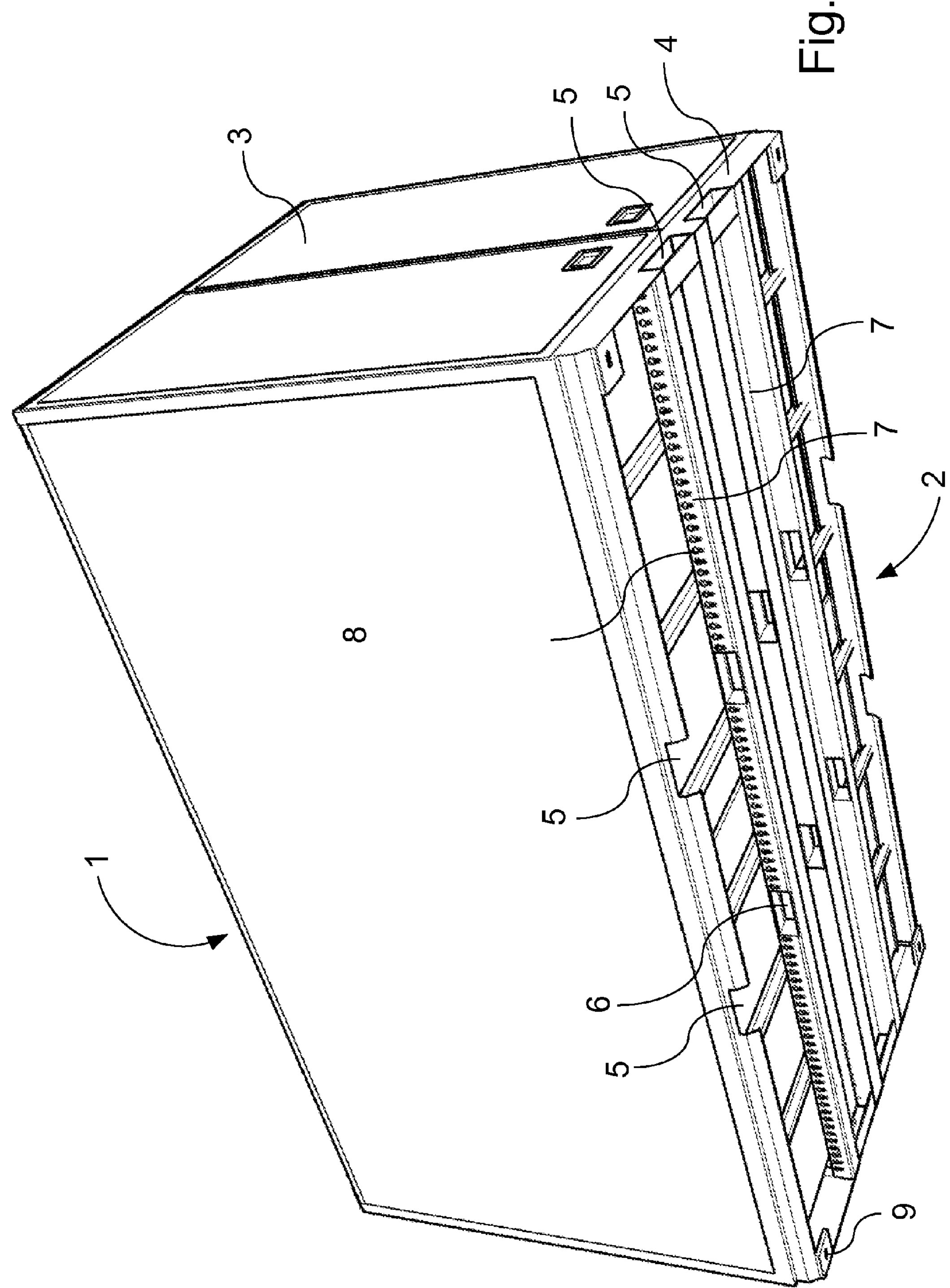
FIG. 1 is a schematic perspective representation of a container showing attachment means provided at the bottom surface of the container.

With reference to FIG. 1 there is shown a schematic perspective representation of a container. The container is generally indicated by reference numeral 1 and is provided with an attachment structure 2 at the bottom surface of the container. In the bottom portion 4 of the container 1 there are provided recesses 5 for engagement with lift means of for instance a forklift. Extending longitudinally through the bottom portion 4 the is provided an attachment structure 2 for attaching and locking the container to a support structure 31 on a transport vehicle, as will be described in detail below. The attachment structure comprises laterally facing guide and engagement surfaces or rails 7 that are provided with through apertures 8 for locking the attachment structure to a support structure 31 (see FIGS. 5 and 7) provided on a transport vehicle. Through apertures 6 for the passage of lift means of for instance a forklift are also provided in the respective rails 7 at locations corresponding to the recesses 5 in the edge portion of the bottom portion 4 of the container. The container 1 may further be provided with retaining means allowing containers to be stacked upon each other, here shown as an opening 9 corresponding with a mating means 9' (not shown) provided at the top portion of the container. It is understood that although the attachment structure 2 extends longitudinally along the bottom portion of the container it would also be possible to provide the attachment structure at other angles relative to the bottom portion 4, for instance in a transversal direction relative to the bottom portion.

Figure 2:
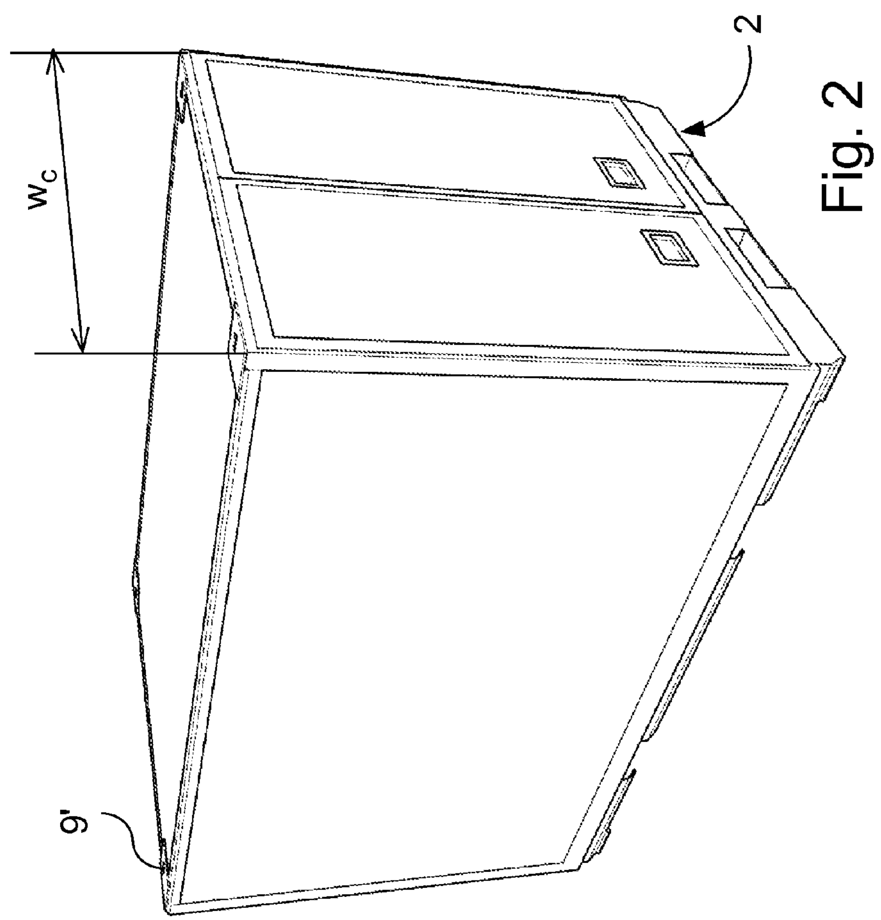
FIG. 2 is a schematic perspective representation of a container.

With reference to FIG. 2 there is shown a schematic perspective representation of a container 1, the width of the container being designated by $W_C$.

Figure 3:
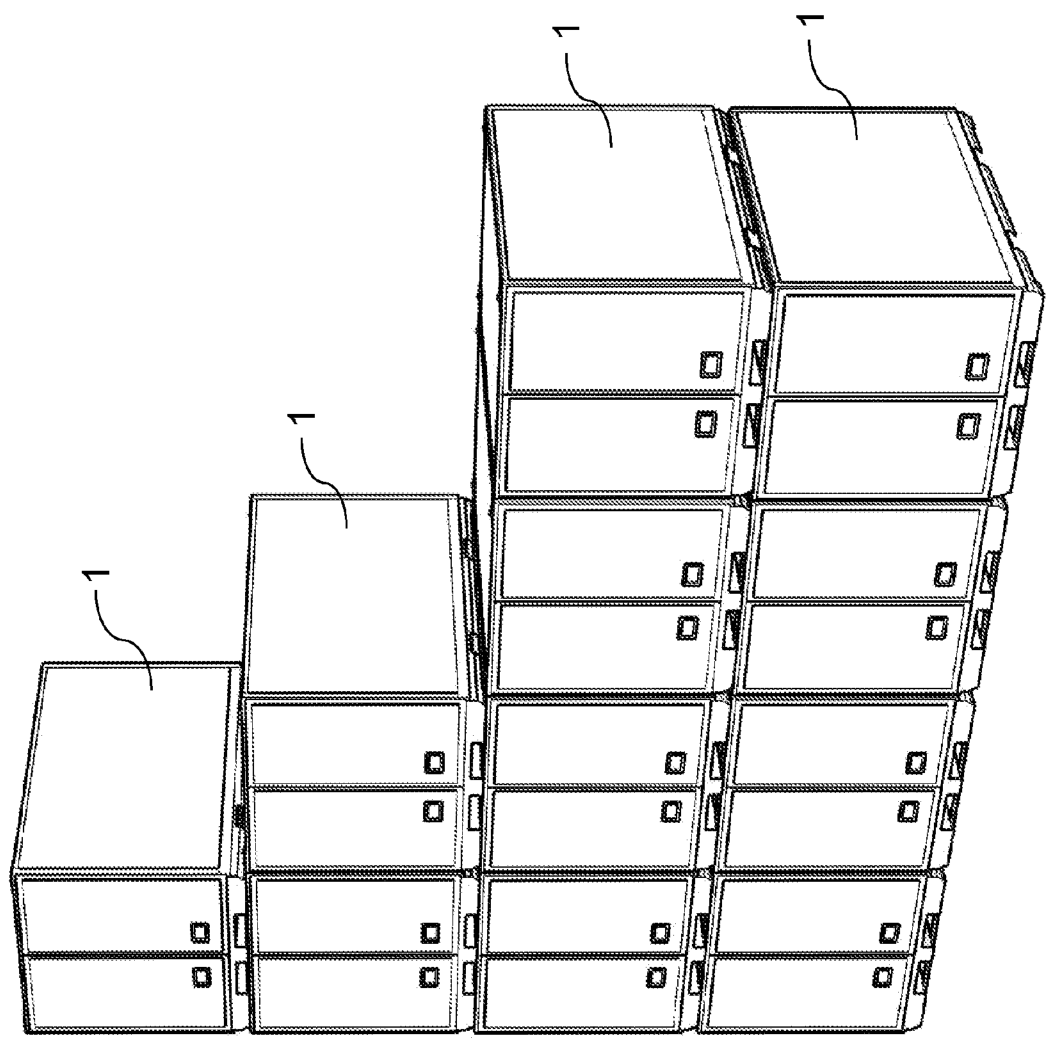
FIG. 3 is a schematic perspective representation of a plurality of containers arranged side-by-side and on top of each other.

With reference to FIG. 3 there is shown a schematic perspective representation of a plurality of containers 1 arranged side-by-side and on top of each other.

Figure 4:
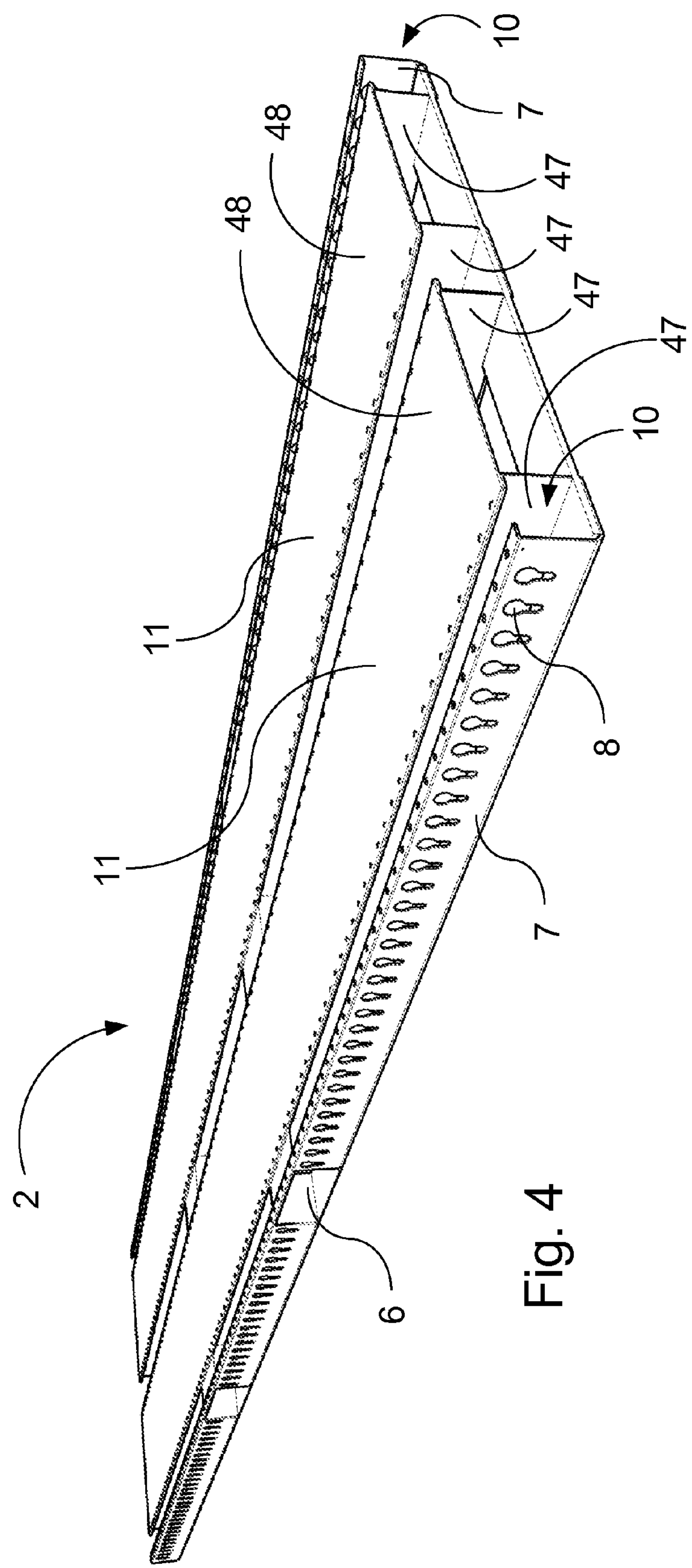
FIG. 4 is a schematic perspective representation of an example embodiment of the attachment structure that is provided at the bottom surface of the container.

With reference to FIG. 4 there is shown a schematic perspective representation of an example embodiment of the attachment structure 2. This structure comprises parallel spaced elongated attachment/support members 10 at either edge portions of the structure, which parallel spaced elongated attachment/support members 10 comprise laterally facing guide and engagement surfaces 7 that are provided with locking openings 8 extending through the surfaces. These locking apertures could have any appropriate shape, not only the one actually shown in the figures. Through the parallel spaced elongated attachment/support members 10 there also extend the openings 6 referred to above. The attachment structure 2 according to this embodiment of the invention comprises further structural elements 47 and 48 that (together with a container attached to the structure) provide rigidity to the structure.

Figure 5:
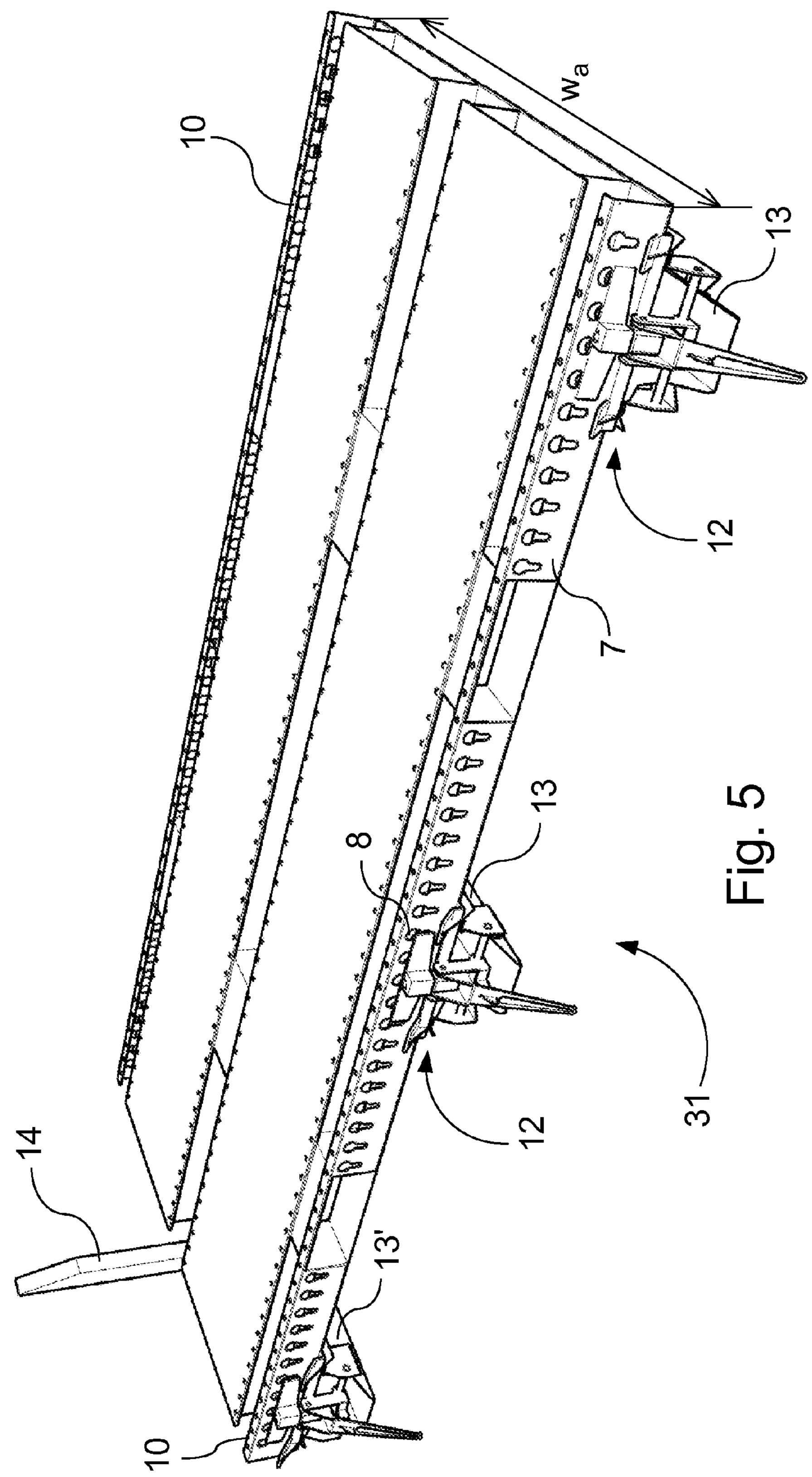
FIG. 5 is a schematic perspective representation of the attachment structure shown in FIG. 4 attached to three transversal beams mounted on a suitable transportation vehicle, wherein the attachment structure is secured to the beams by means of releasable locking members.

With reference to FIG. 5 there is shown a schematic perspective representation of the attachment structure shown in FIG. 4 attached to a support structure 31, which support structure in the shown example comprises three transverse support members 13 that can be mounted on a suitable transportation vehicle, wherein the laterally facing guide and engagement surfaces 7 of the attachment structure 2 are secured to the transverse support members 13 by means of releasable locking mechanisms 12, each being in locking engagement with corresponding openings 8 in the laterally facing guide and engagement surfaces 7. As it appears more clearly from FIG. 7, an end beam 13' is provided with an abutment 14 that prevents the attachment structure from being pushed further to the left (as seen in FIG. 5) than the position defined by the end beam 13'.

Figure 6:
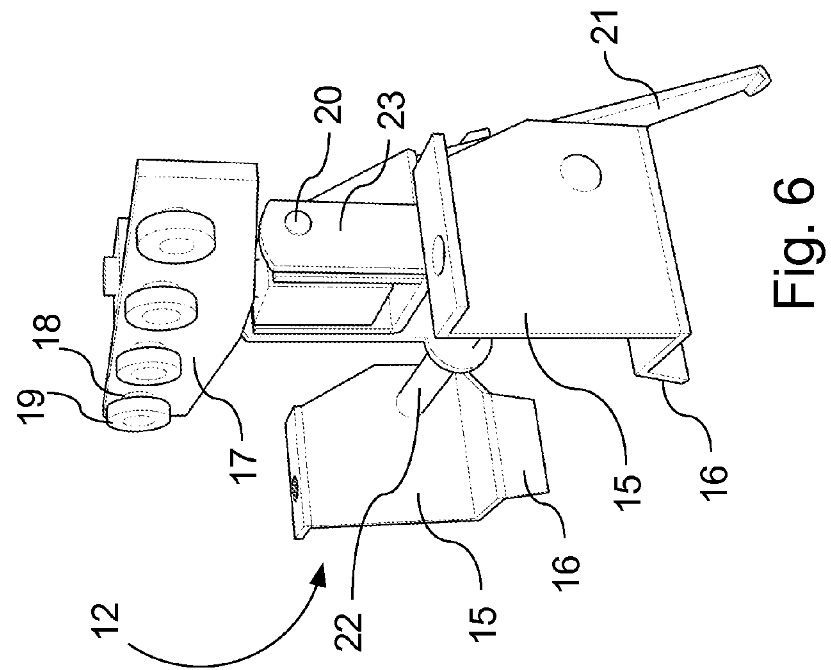
FIG. 6 is a schematic perspective representation of an embodiment of releasable locking member for locking the container to an underlying structure for instance on a truck.

With reference to FIG. 6 there is shown a schematic perspective representation of an embodiment of a releasable locking mechanism generally designated by reference numeral 12 for locking the container to an underlying structure for instance on a lorry. The locking mechanism 12 comprises opposing support portions 15, 16, where the portion 16 can be attached to the transverse support members 13 shown in FIGS. 4 and 5. On the axle 22 extending between the opposing support portions 15 there is provided a locking means as such, which comprises a support plate 17 on which is provided locking members 18, 19 that are formed for insertion into the openings 8 provided in the laterally facing guide and engagement surfaces 7 of the attachment structure 2. Due to the shape of the openings 8 it is possible to insert the locking members 18, 19 into the openings and then, by means the of a lever arrangement 20, 21, 23 to shift the stem portion 18 of the locking members into the narrow portion of the openings 8. In this position of the locking members 18, 19, the support structure, and hence the container/swap box provided upon it, will be locked to the underlying transverse support member 13, and hence to a vehicle, upon which these members are mounted.

It is understood that other locking means than the one actually described above could also be used.

Figure 7:
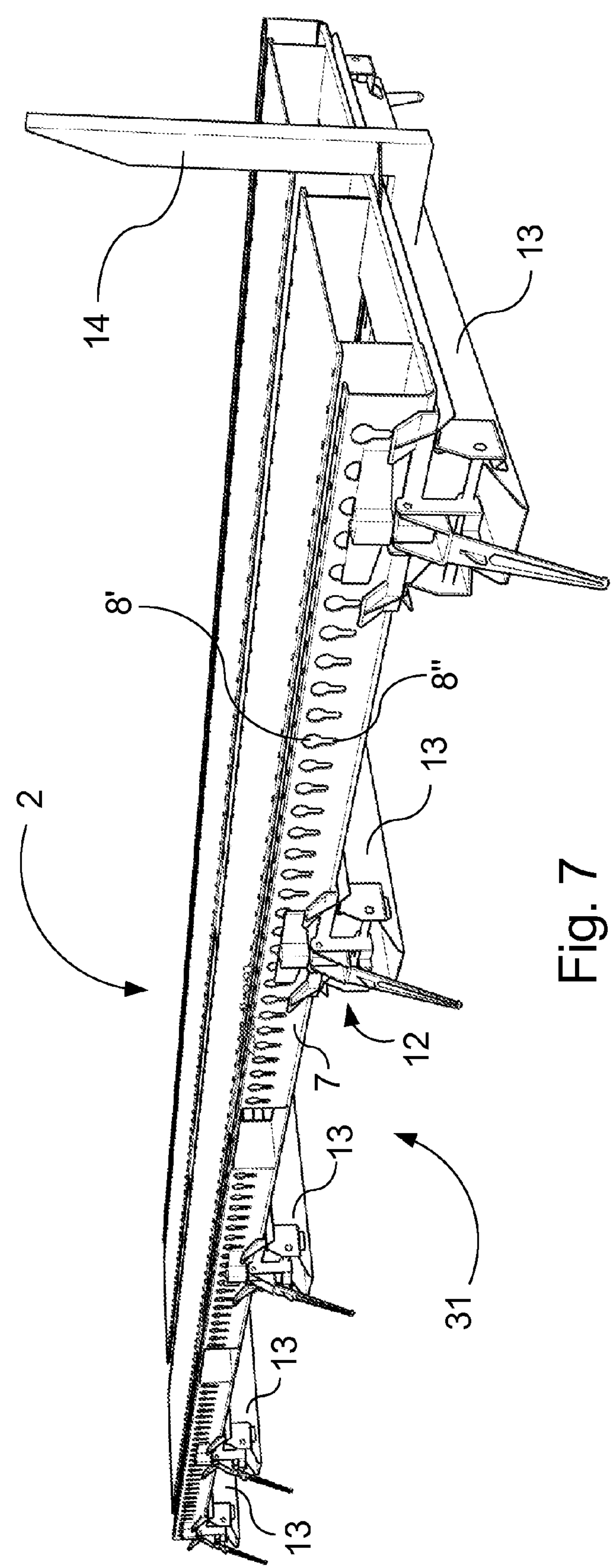
FIG. 7 is a schematic view corresponding to that of figure six showing the locking means being provided on a number of transversal beams mounted on for instance a truck, the locking means being in locking engagement with the attachment structure.

With reference to FIG. 7 there is shown a schematic view corresponding to that of FIG. 6 showing locking mechanisms 12 being provided on a number of transverse support members 13, the locking mechanisms 12 being in locking engagement with the attachment structure 2. Also, the abutment 14 described above is shown mounted to the transverse support member 13 furthest to the right in FIG. 7.

Figure 8:
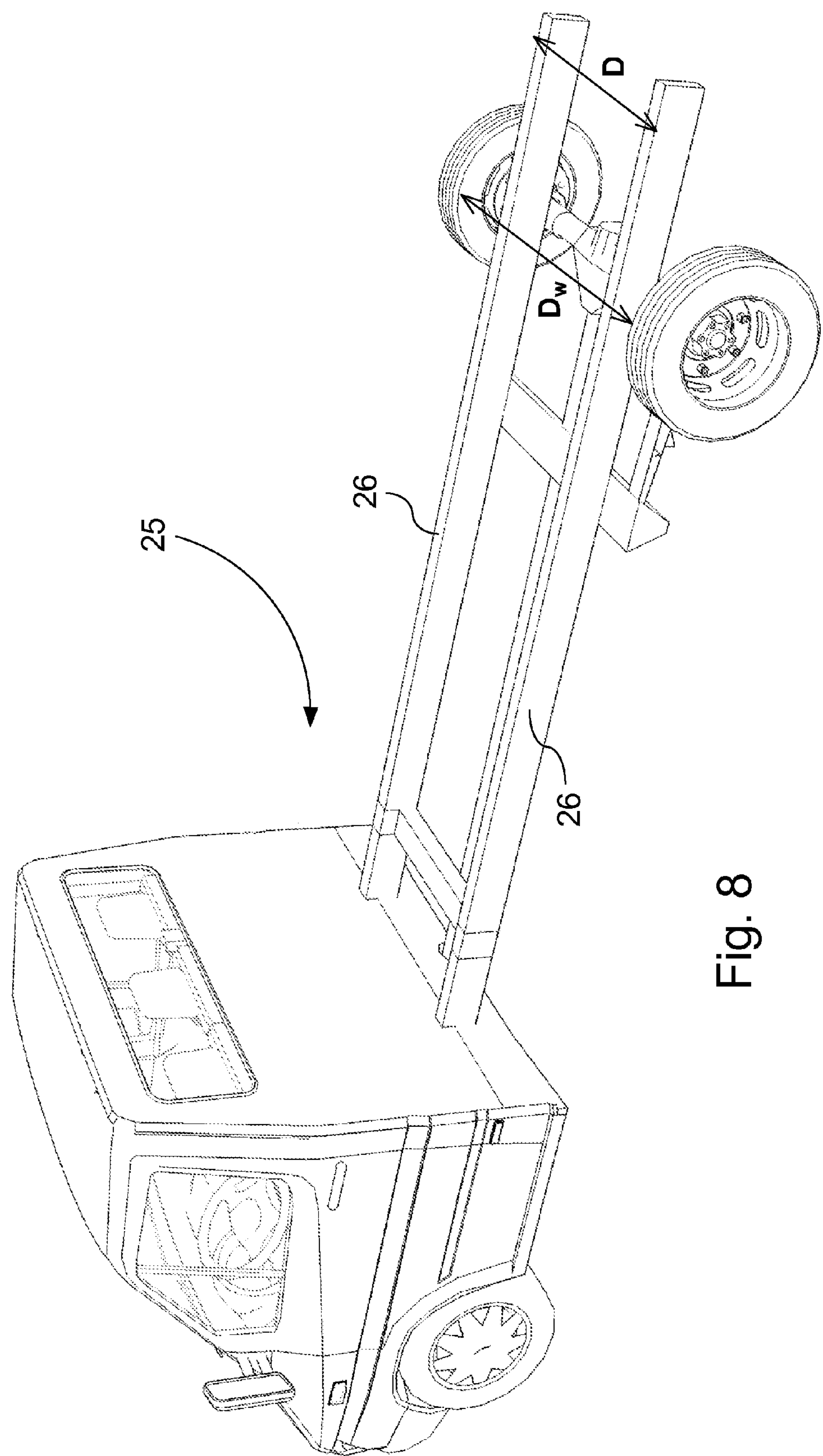
FIG. 8 is a schematic perspective representation of a lorry that can be used in connection with the containers, prior to the provision of transversal beams as for instance shown in FIG. 7.
Figure 9:
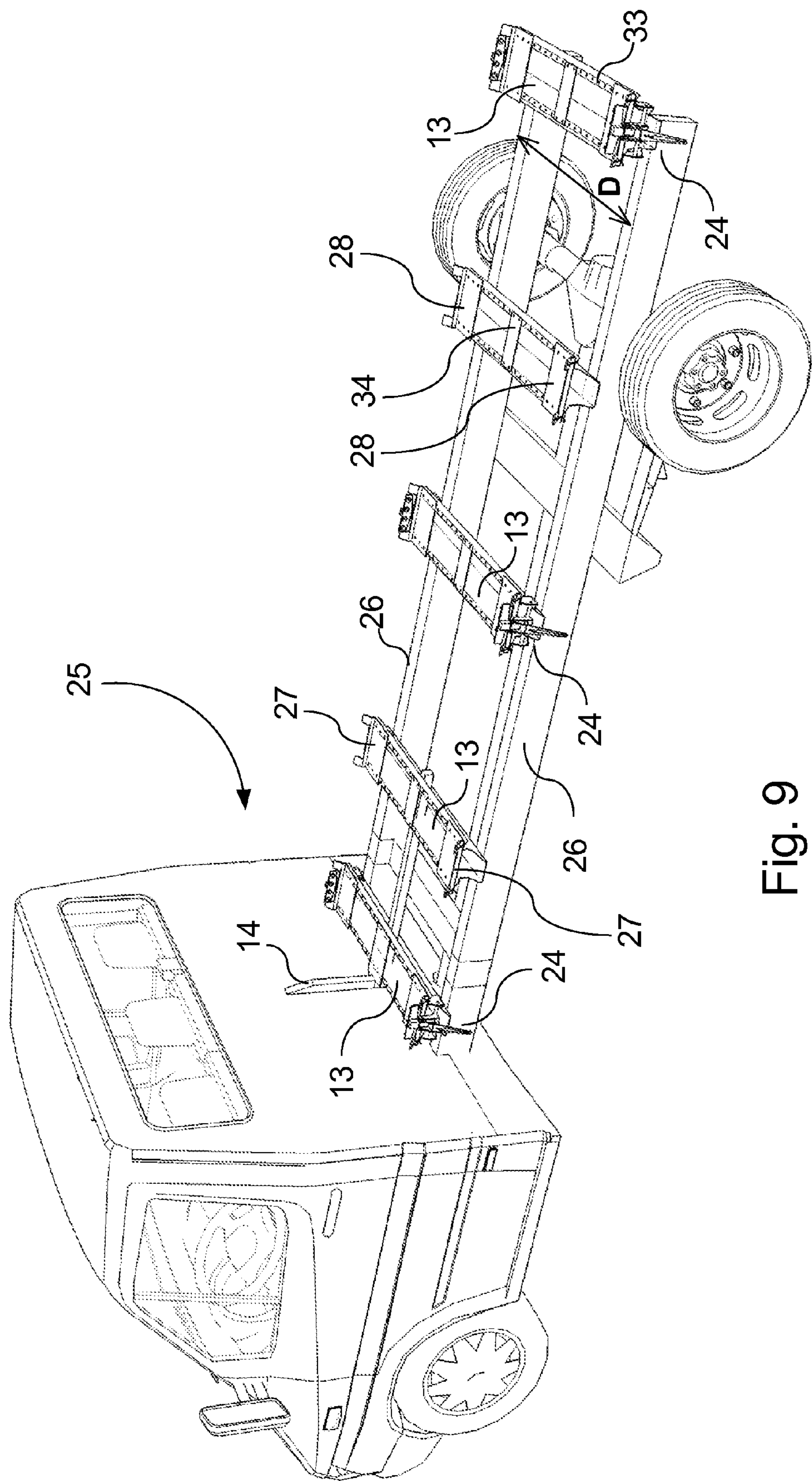
FIG. 9 is a schematic perspective representation of the lorry of figure eight provided with transversal beams and locking means provided on some of the transversal beams.

With reference to FIG. 8 there is shown a schematic perspective representation of a lorry 25 that can be used in connection with the containers/swap boxes, the lorry 25 being shown prior to the provision of the transverse support members 13 as for instance shown in FIG. 7. These members 13 are to be attached to the longitudinal chassis beams 26 of the lorry as shown in FIG. 9. The distance between the outwardly facing surfaces of the respective beams 26 is designated by D and the distance between the inner surfaces of the wheels is designated by Dw. These dimensions impose limitations on the dimensions of the various structures according to the invention as will be described below. Distance D is typically 900 mm, 110 mm or 1300 mm, depending on the make and model of the vehicle.

With reference to FIG. 9 there is shown a schematic perspective representation of the lorry 25 of FIG. 8 provided with transverse support members 13 and locking mechanisms 12 provided on some of the transverse support members 13. It would also be possible to provide locking mechanisms 12 on all of the transverse support members 13, if desired. The provision of locking mechanisms on all support members 13 increases the strength and stability of the connection between the attachment structure and the support structure. The optimum number of transverse support members 13 to be used depends among others on the dimensions of the container/swap box to be attached to the support structure 31 and on the weight of the container/swap box. The transverse support members 13 are at either longitudinal end provided with support and guide structures 27 for guiding the attachment structure on the container/swap box into its correct position on the transverse support members 13 during loading of the container/swap box on the lorry 25.

With reference to FIGS. 10, 11, 12 and 13 there are shown schematic perspective representations that illustrate the provision of the support and guide structure 27 at chosen locations on the transverse support members 13, for instance as shown at either the longitudinal end hereof for guiding the container 1 with its attachment structure 2 into its proper position on the transverse support members 13. Specifically, the support and guide structure 27 comprises a support portion 28 for attachment to the transverse support member 13, outwardly inclined guide portions 29 for guiding the attachment structure on the container/swap box into its proper position on the transverse support members 13 and inwardly facing guide and retaining surfaces 30 for providing lateral support for the attachment structure, once the container 1 and associated attachment structure 2 is in the final position on the transverse support members 13. The process of locating an attachment structure 2 into the support structure is illustrated by the sequence of pictures shown in FIGS. 10, 11 and 12.

Figures 10, 11, 12, 13:
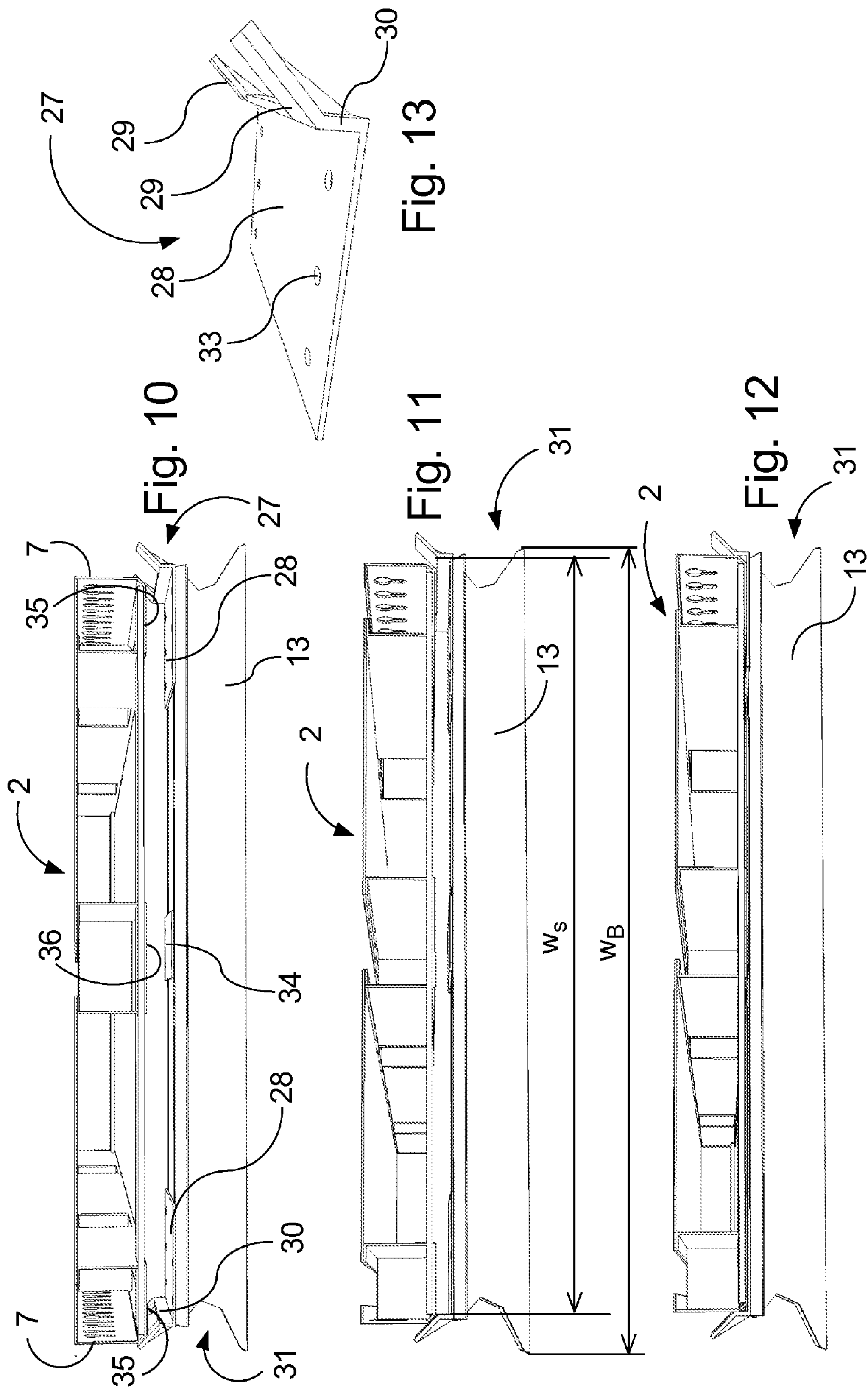
FIGS. 10, 11, 12 and 13 are schematic perspective representations that illustrate the provision of edge guide means at the longitudinal ends of the transversal beams for guiding the container with its attachment structure into its proper position on the transversal beams.

As shown in FIG. 11, the transverse support member 13 and the support and guide structure 27 are characterized by the parameters $W_B$, i.e. the longitudinal extension of the transverse support member 13 and $W_S$, i.e. the distance along the respective transverse support member 13 between the opposing inwardly facing guide and retaining surfaces 30. Although the support and guide structure 27 is generally shown positioned at either longitudinal ends of the respective transverse support member 13, it would also be possible to locate the support and guide structure 27 at other locations on the beam and hence with a distance $W_S$ that could be even substantially less than the longitudinal extension of the transverse support member 13. Even an asymmetrical positioning of the opposing support and guide structures 27 would be possible, if desired.

The support and guide structure 27 comprises through openings 33 for attachment to the underlying transverse support member 13. Other means of attachment would of cause also be possible. Further, two separate outwardly inclined guide portions 29 are provided in the illustrated embodiment of the support and guide structure 27, but a single inclined guide portion could alternatively be used.

FIG. 10 further shown the provision of a central support surface 34 on the transverse support member 13 upon which a corresponding portion of the attachment structure 2 can be supported. The attachment structure 2 is thus supported on each transverse support member 13 by the three support surfaces 28 and 34. Other arrangements of support surfaces may alternatively be used.

Figure 14:
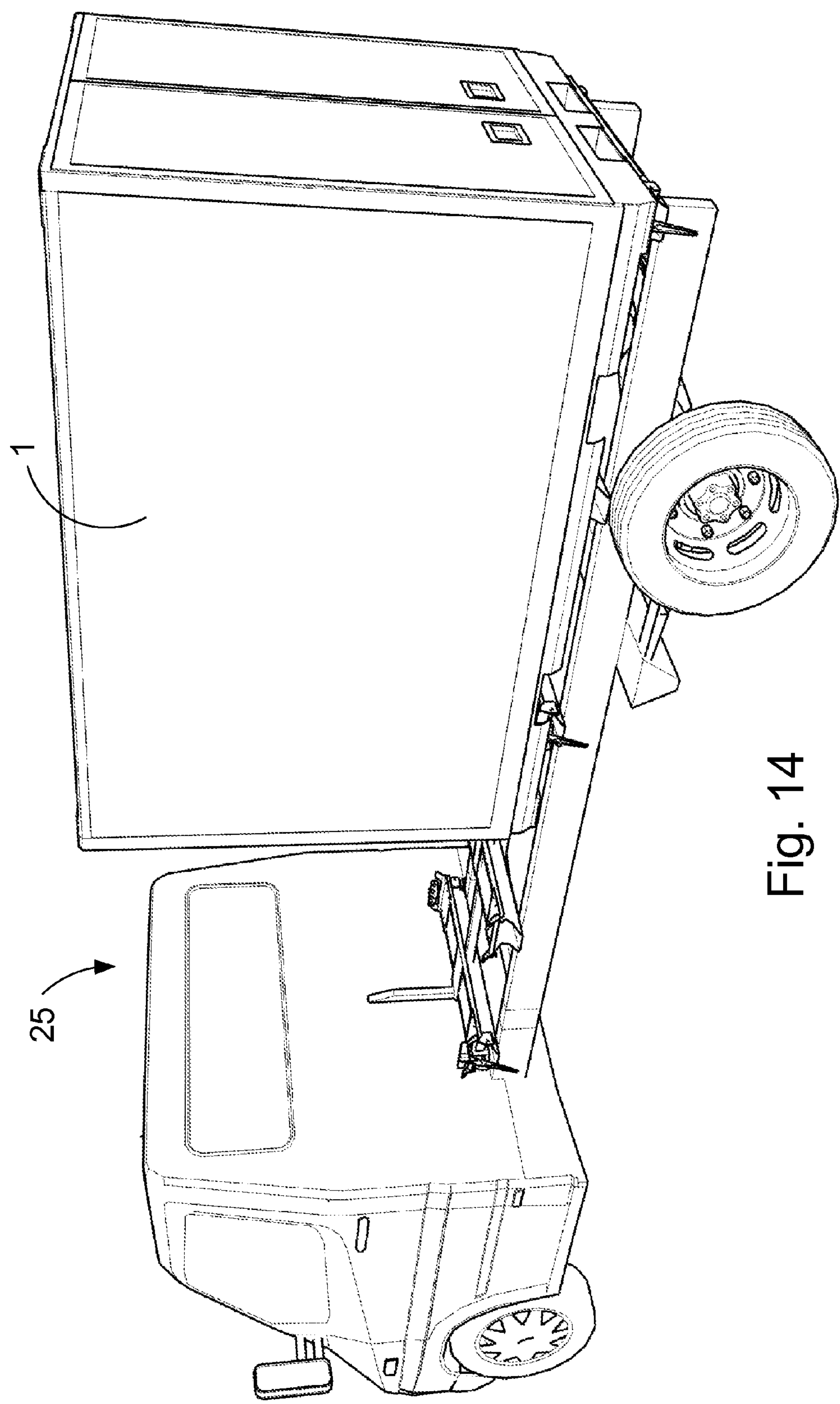
FIGS. 14, 15 and 16 are schematic perspective representations that illustrate the loading of a container according to the invention on a lorry.
Figure 15:
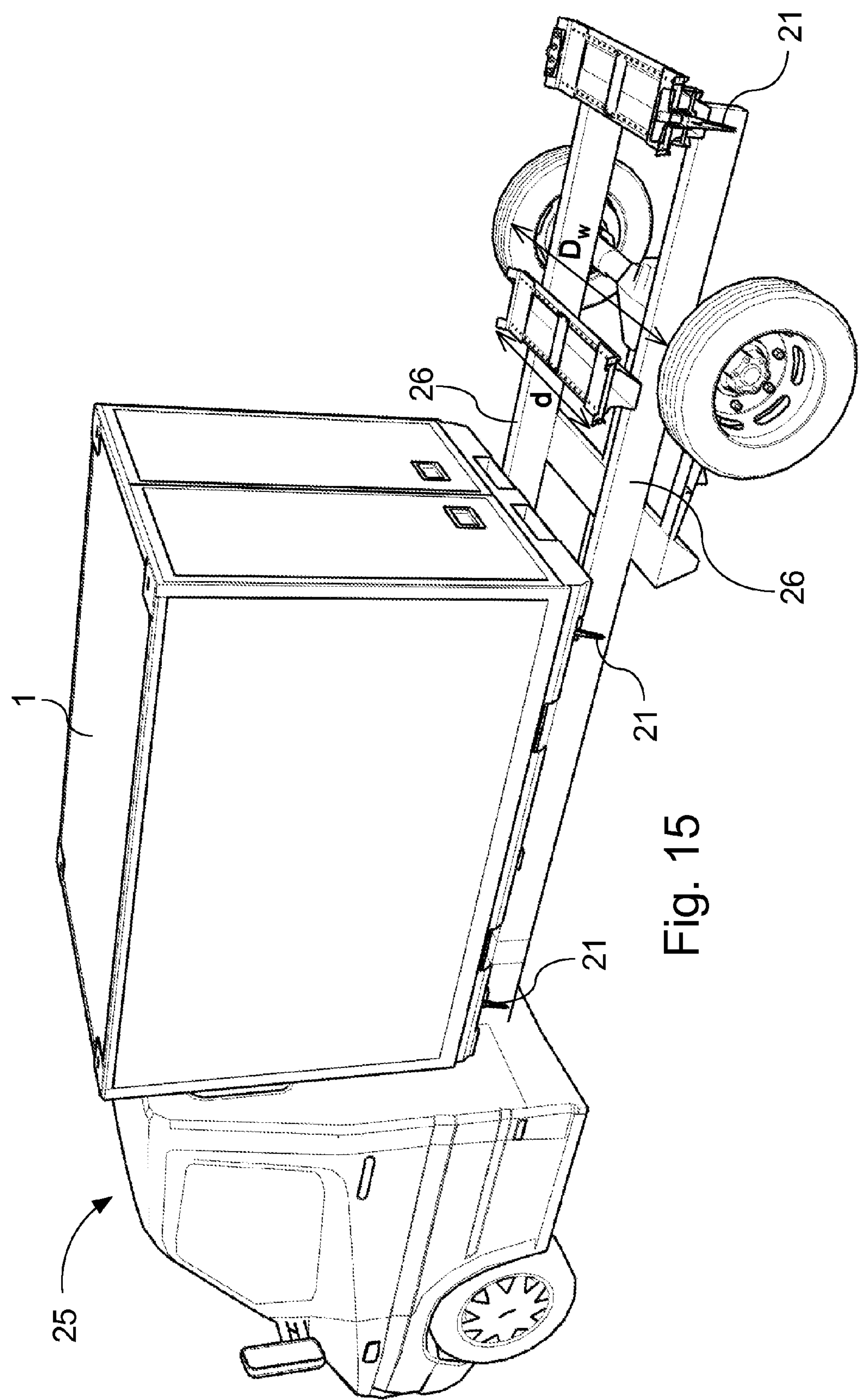
Figure 16:
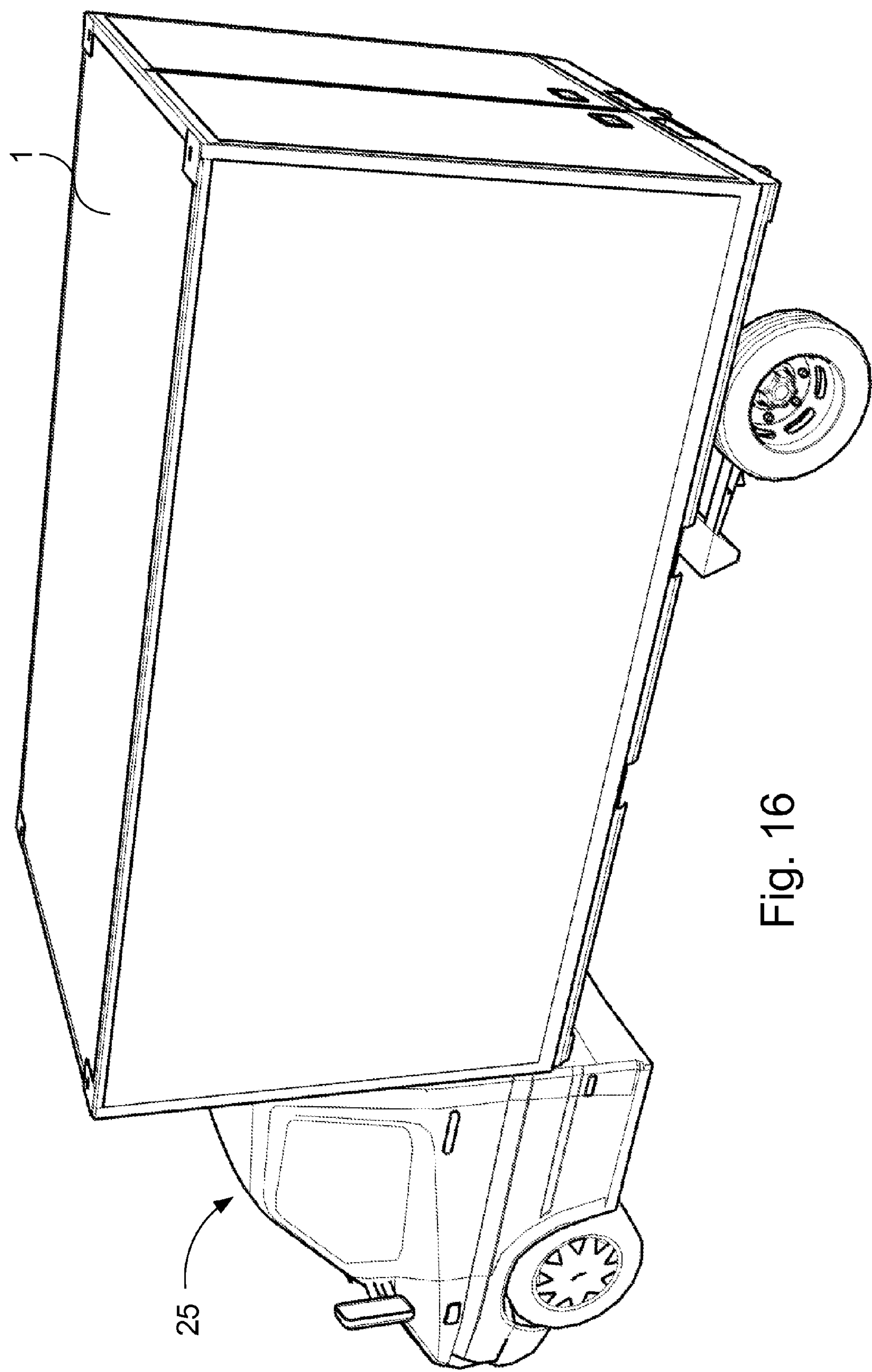

With reference to FIGS. 14, 15 and 16 there are shown schematic perspective representations that illustrate the loading of a container 1 on a lorry 25. The maximum width of the container and support structure is determined by the distance $D_W$ between the wheels of the lorry.

Figure 17:
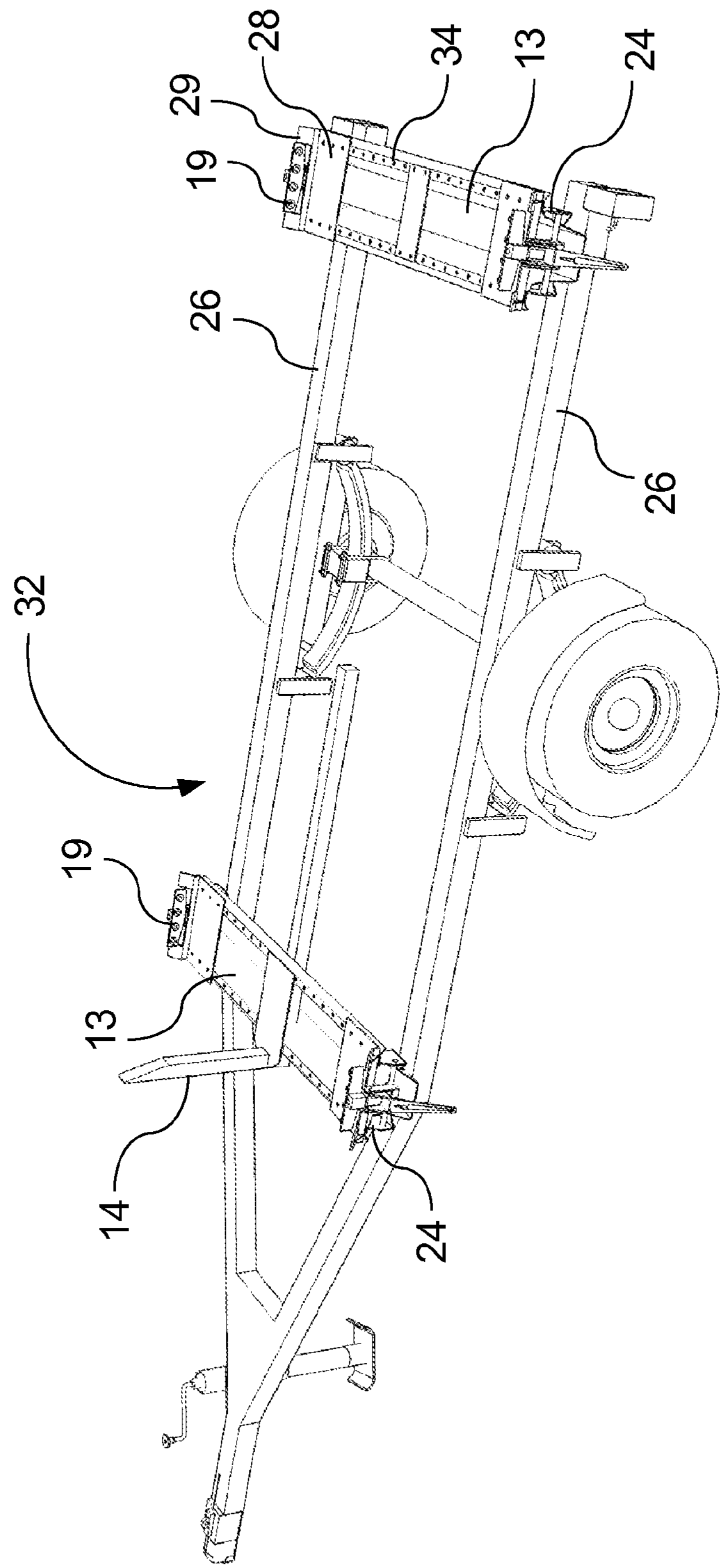
FIG. 17 is a schematic perspective representation of an alternative transport vehicle (a trailer) that can be used with the containers according to the invention, the vehicle being provided with two transversal beams.

With reference to FIG. 17 there is shown a schematic perspective representation of an alternative transport vehicle (a trailer) generally designated by reference numeral 32 that can be used with the containers. The trailer 32 is in this embodiment provided with two transverse support members 13 as described above resting on, and fixed to the chassis beams 26 of the trailer. The various elements shown in the figure are designated by the same reference numerals as the corresponding elements described above. The transverse support members 13 can be provided with series of openings 34 for attachment of the respective support and guide structure 27 at the appropriate locations on the transverse support members 13.

Figure 18:
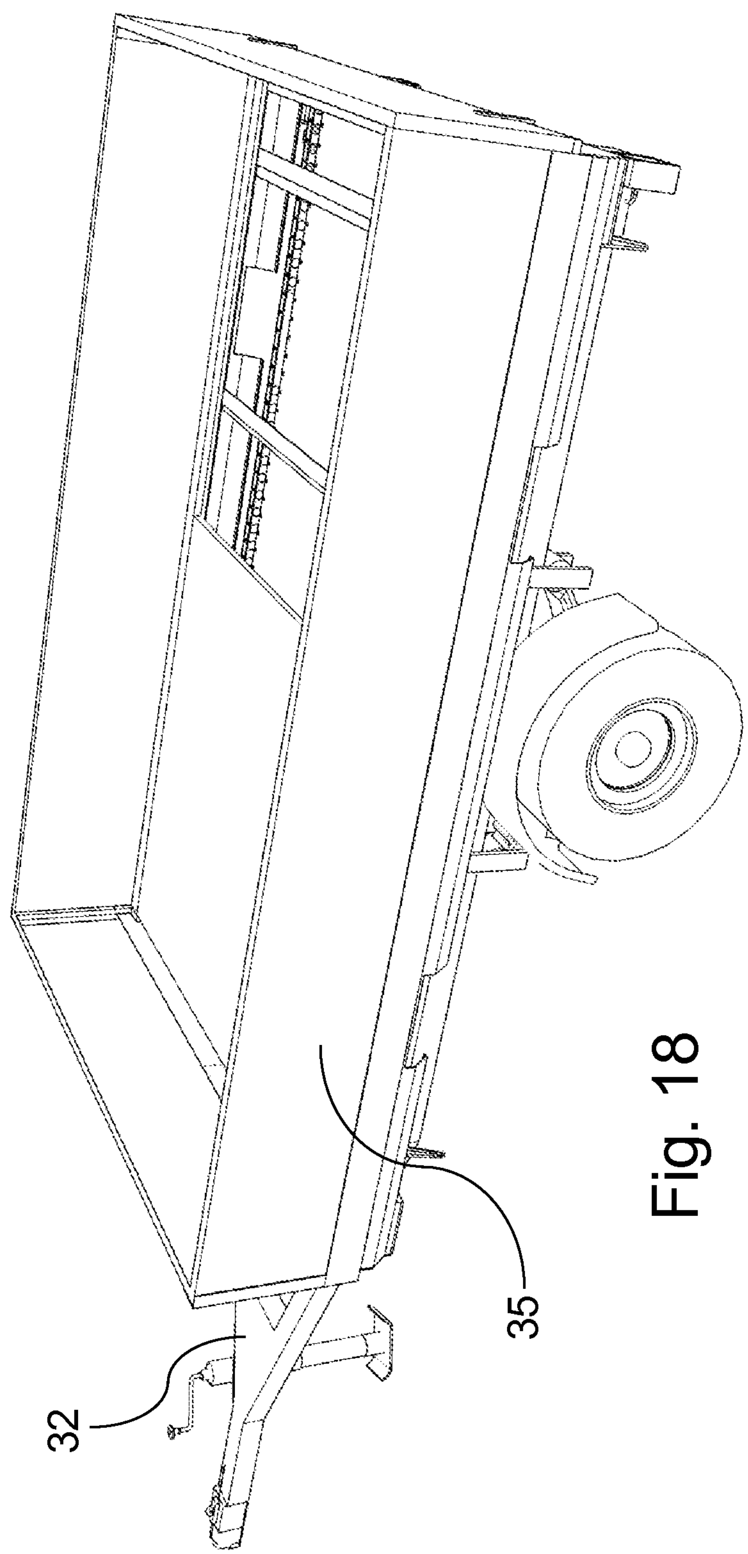
FIG. 18 is a schematic perspective representation of the use of an alternative container on the trailer shown in figure seventeen.
Figure 19:
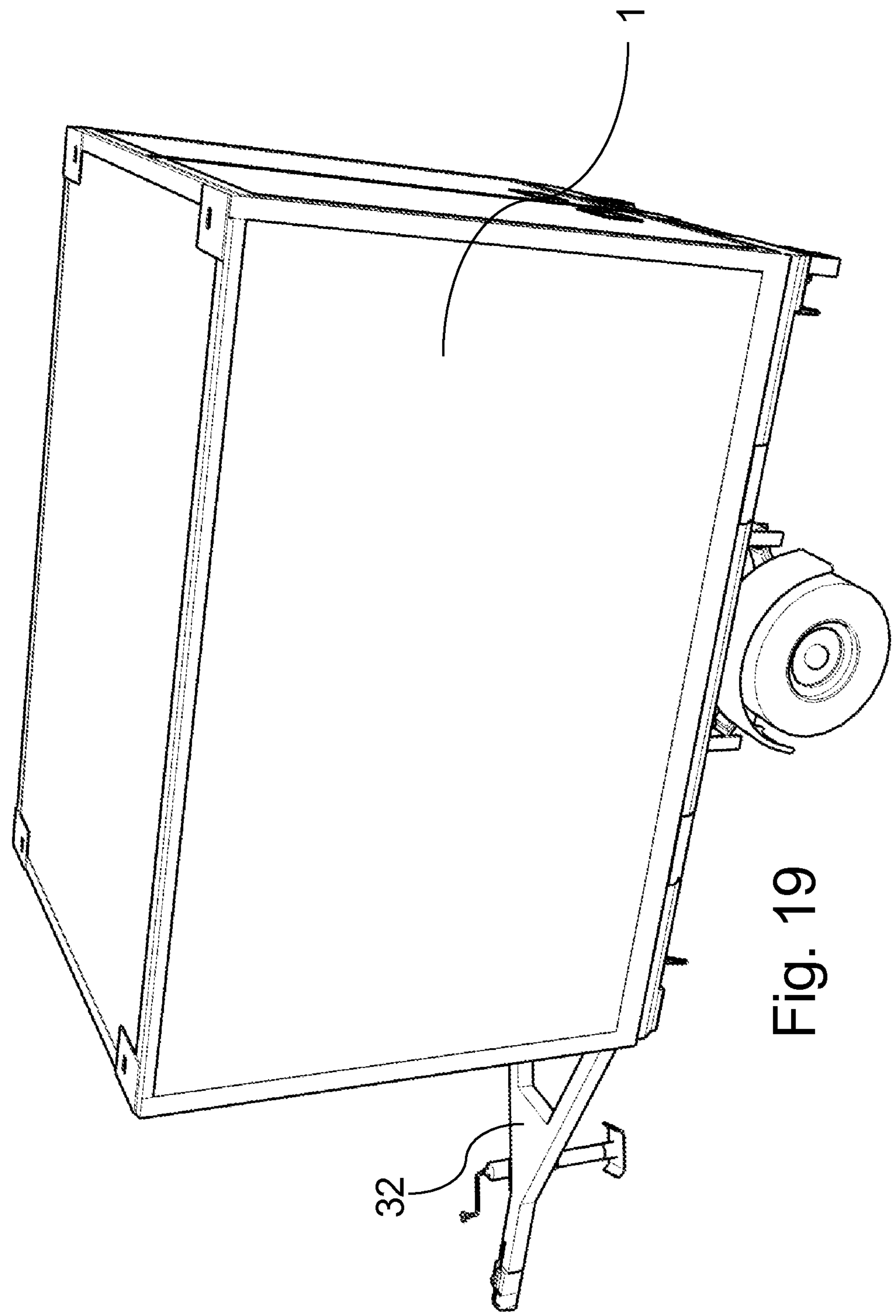
FIG. 19 is a schematic perspective representation of the provision on the trailer of a container of the same kind as shown for instance in figure one.
Figure 20:
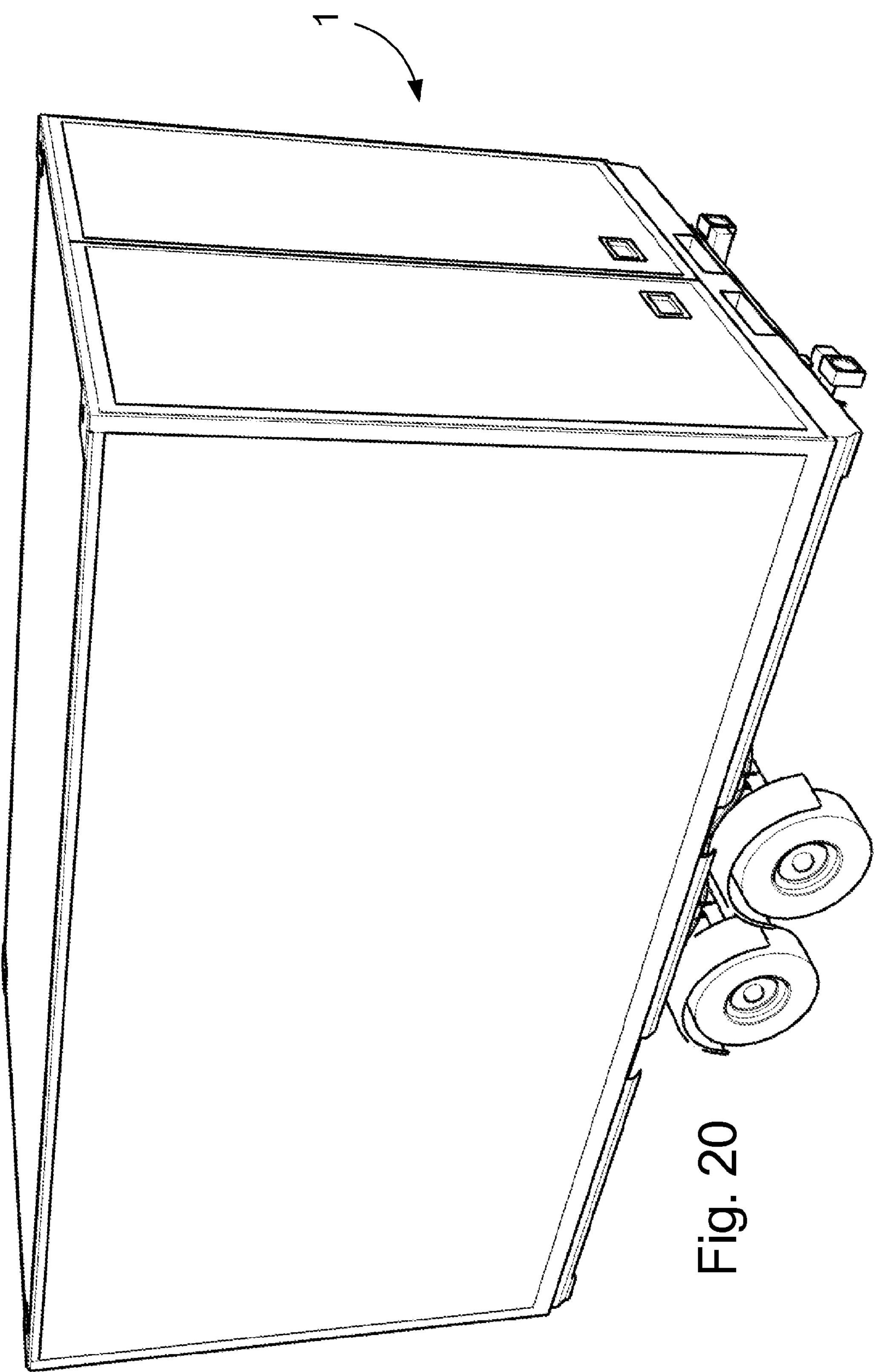
FIG. 20 is a schematic perspective representation of a container provided on still another kind of transport vehicle.

With reference to FIG. 18 there is shown the trailer 32 of FIG. 17 provided with one example of a container, in the shown example in the shape of an upwardly open box 35. Alternatively, other kinds of containers could be used instead of the box 35, for instance swap boxes. Such alternatives are shown in FIGS. 19 and 20.

Although the scope of the invention is not limited to any specific numerical values of the various dimensions described above, typical values/ranges of the dimensions D, $W_S$ and $W_B$ are: D≤1.1 meters, $W_B$≤1.1 meters and $W_{B,min}$≤$W_S$≤$W_B$, where $W_{B,min}$ is determined be the transversal distance between the laterally facing guide and engagement surfaces 7 of the specific attachment structure 2 to be used together with the specific support structure 31.

Figure 21:
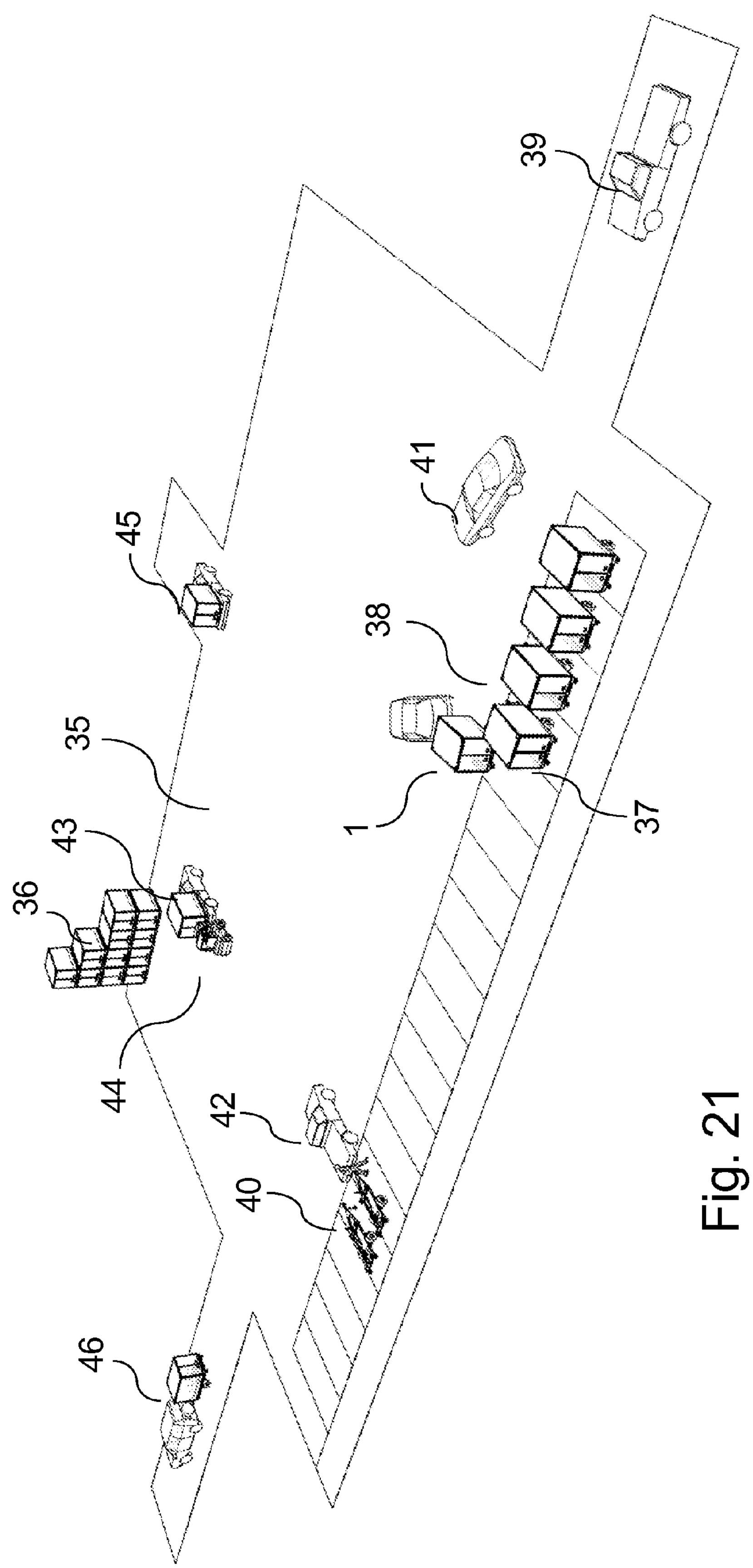
FIG. 21 is a schematic perspective representation of an example use of containers and transport means.

It is possible to support and attach containers/attachment structures of a width within a broad range and if desired of a much smaller width than the distance D between the beams 26 of the chassis of the transport vehicle makes the invention extremely useful for easy loading/reloading and transport of many different types and dimensions of containers. This ease of application is further increased by the provision of the quick lock mechanisms 12 on at least some of the transverse support members 13. With reference to FIG. 21 there is shown a schematic perspective representation of an example use of containers and transport means. Goods have been delivered to a transit area 35 for instance on large trucks or on railway wagons (not shown in the figure) and stored in containers 1. Containers 1 can for instance be stacked 36 or be placed on suitable vehicles such as the trailers 37 shown in the figure. An automobile 41 may pick up a trailer with a container and leave the transit area 46, or a lorry 42 may pick up a trailer 40 provided with support means after which a container is placed on the trailer for instance by means of a fork lift. The container may also be provided directly on the bed of a lorry 43 that is provided with support means. Distribution of the goods in the containers finally takes place by means of environmental friendly vehicles as indicated by reference numerals 45 and 46. The flexible and versatile containers and transport vehicles according to the invention makes it easy and economically attractive to re-load goods from less environmental friendly and possibly larger vehicles to more environmental friendly and possibly smaller vehicles, that can furthermore be more easy to maneuver within an inner region of a city with narrow streets and much traffic.

It is an advantage of the invention that it provides for an attachment structure (2) for supporting and releasably attaching a container 1, cargo bed or the like to a transport vehicle 25, 32 and a mating support structure 31 configured to be provided on the transport vehicle 25, 32, the attachment structure being provided with releasable locking mechanisms 12 configured to provide a releasable locking of the attachment structure 2 to the support structure 31. The invention facilitates easy and flexible distribution of goods by means of environmental friendly vehicles for instance within the inner region of a city.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality.

The invention claimed is:

1. An attachment structure for supporting and releasably attaching a container (1) or cargo bed to a transport vehicle (25, 32), said container (1) or cargo bed has a length and a width $W_C$, said attachment structure comprises two parallel spaced elongated attachment/support members (10) that extend along at least most of the length of said container (1) or cargo bed, said elongated attachment members (10) comprising a downwardly facing support surface (35) for abutting an upwardly directed support surface (28) of a support structure (31) on said transport vehicle (25, 32), said upwardly directed support surface (28) having a lateral and parallel spaced inwardly facing guide and retaining surface (30), said elongated attachment/support members (10) have an integral laterally facing guide and engagement surface (7) extending along the length of the elongated attachment/support members and have recesses or apertures (8) in said laterally facing guide and engagement surface (7) for entering in a locking engagement with at least one lock mechanism (12) associated with said transport vehicle (25, 32) and wherein said recesses or apertures (8) are substantially evenly distributed along substantially the entire longitudinal extent of said laterally facing guide and engagement surfaces (7) or substantially evenly distributed along one or more portions thereof.

2. An attachment structure according to claim 1, wherein said integral laterally facing guide and engagement surfaces (7) are directed oppositely and outwardly facing and are spaced at a distance ($W_a$), wherein the distance ($W_a$) matches a distance ($W_s$) of said lateral and parallel spaced inwardly facing guide and retaining surfaces (30) of said support structure (31).

3. An attachment structure according to claim 1, wherein said attachment structure (2) is a bed that can be located at the bottom of said container (1) or cargo bed or form the bottom of said container (1) or cargo bed.

4. An attachment structure according to claim 1, wherein a distance ($W_a$) between the laterally facing guide and engagement surfaces (7) is substantially less than said width ($W_c$) of the container or cargo bed.

5. A container comprising an attachment structure according to claim 1.

6. A container according to claim 5, wherein said attachment structure is formed as an integral part of the container.

7. An attachment structure according to claim 1 wherein said support structure (31) further comprises a plurality of transverse support members (13) for supporting the attachment structure (2), each transverse support member having first and second longitudinal ends, and a plurality of locking members (24) provided on respective lock mechanisms (12) for releasable locking of said attachment structure (2) to said support structure (31).

8. An attachment structure according to claim 7, wherein at least one of said transverse support members (13) of said support structure (31) is provided with said lock mechanisms (12) at either of the transverse support member longitudinal ends.

9. An attachment structure according to claim 7, wherein each said lock mechanism (12) of said support structure (31) comprises locking members (24) that are configured for releasable engagement with said recesses or apertures (8) provided in said attachment structure (2).

10. An attachment structure according to claim 7, wherein each said lock mechanism (12) of said support structure (31) is a quick lock mechanism comprising locking members (24) configured to be inserted into said recesses or apertures (8) of the attachment structure (2) and upon activation of an actuator, locking the locking members (24) into a corresponding opening of said recesses or apertures (8).

11. An attachment structure according to claim 7, wherein at least some of said transverse support members (13) of said support structure (31) are further provided with a pair of spaced apart support and guide structures (27) provided with an said inwardly facing guide and retaining surface and an additional inwardly facing guide and retaining surface (30), where a distance ($W_s$) between the inwardly facing guide and retaining surfaces (30) of a given said pair of support and guide structures (27) is substantially equal to or more than the distance (Wa) between said laterally facing guide and engagement surfaces (7) of said attachment structure (2).

12. An attachment structure according to claim 10, where a support and guide structure (27) of the transverse support member is provided with outwardly inclined guide portions (29) for guiding said attachment structure (2) onto the transverse support member (13).

13. An attachment structure according to claim 7, wherein a width ($W_B$) of the transverse support members (13) of the support structure exceeds a typical distance (D) between outer sides of and longitudinal beams (26) of a cargo vehicle (25, 32).

14. An attachment structure according to claim 2, wherein said distance ($W_s$) between said inwardly facing guide and retaining surfaces (30) is less than the width ($W_B$) of transverse support members (13).

15. An attachment structure according to claim 7, wherein each of said transverse support members (13) of the support structure (31) is provided with a pattern of through holes or openings (34) distributed in a longitudinal direction of the transverse support member (13) for attachment of the transverse support member (13) to longitudinally extending beams (26) of a chassis of a transport vehicle (25, 32).

16. A transport vehicle for transporting containers (1), said transport vehicle being provided with a support structure according to claim 7.

17. A transport vehicle according to claim 15, where the transport vehicle is a truck, lorry or trailer.

18. A transport vehicle according to claim 15, where the transport vehicle is a railway wagon.

19. An assembly comprising an attachment structure (2) according to claim 1 and a support structure (31) according to claim 7, where said laterally facing guide and engagement surfaces (7) of the attachment structure (2) are adapted to fit into a space formed between said inwardly facing guide and retaining surfaces (30) of the support structure (31).

20. Assembly according to claim 18, wherein said laterally facing guide and engagement surfaces (7) are provided with said recesses or apertures (8) for entering in a locking engagement with a lock mechanism (12) provided on the support structure (31).

* * * * *